(12) United States Patent  
Johnson (10) Patent No.: US 7,015,856 B1  
(45) Date of Patent: Mar. 21, 2006

(54) DEVICE AND METHOD FOR SPR DETECTION IN A MODE-S TRANSPONDER

(75) Inventor: Timothy L. Johnson, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 10/866,925

(22) Filed: Jun. 14, 2004

Related U.S. Application Data

(63) Continuation of application No. 10/323,397, filed on Dec. 18, 2002, now Pat. No. 6,768,445.

(51) Int. Cl.  
*G01S 13/93* (2006.01)  
*G01S 13/74* (2006.01)

(52) U.S. Cl. ............................ 342/32; 342/29; 342/30; 342/36; 342/37; 342/42; 342/43; 342/51

(58) Field of Classification Search .......... 244/3.1–3.3; 342/29–51, 175, 195; 375/340, 354, 355, 375/358, 359–370, 256, 238, 316  
See application file for complete search history.

(56) References Cited

U.S. PATENT DOCUMENTS

| | | | | |
|---|---|---|---|---|
| 3,691,559 | A * | 9/1972 | Jackson | 342/31 |
| 3,931,622 | A * | 1/1976 | Freedman | 342/42 |
| 4,128,835 | A * | 12/1978 | Russell | 342/46 |
| 4,370,653 | A * | 1/1983 | Crowley | 342/42 |
| 4,955,038 | A * | 9/1990 | Lee et al. | 375/256 |
| 5,089,822 | A | 2/1992 | Abaunza et al. | 342/30 |
| 5,179,384 | A | 1/1993 | De Haan | 342/37 |
| 5,264,853 | A | 11/1993 | Sturm et al. | 342/30 |
| 5,341,139 | A | 8/1994 | Billaud et al. | 342/40 |
| 5,363,109 | A | 11/1994 | Hofgen et al. | 342/31 |
| 5,400,031 | A | 3/1995 | Fitts | 342/36 |
| 5,455,586 | A | 10/1995 | Barbier et al. | 342/37 |
| 5,471,509 | A | 11/1995 | Wood et al. | |
| 5,528,244 | A | 6/1996 | Schwab | 342/37 |
| 5,548,291 | A * | 8/1996 | Meier et al. | 342/44 |
| 6,483,453 | B1 | 11/2002 | Oey et al. | 342/30 |
| 6,768,445 | B1 * | 7/2004 | Johnson | 342/32 |
| 6,788,245 | B1 * | 9/2004 | Johnson | 342/32 |
| 6,856,274 | B1 * | 2/2005 | Johnson | 342/32 |

OTHER PUBLICATIONS

"Pro's and Con's of Mode S", Avionics West, Inc., May 27, 2002.  
"Garmin Mode-S Transponder", The Flying Magazine Staff, Garmin Mode-S Transporter, Gaemin, GTX 330, traffic information services, printed Aug. 12, 2002.  
Brochure, KT 73, Bendix/King, Data Link Transponder, Honeywell International Inc., 2001.  
"Mode S . . . in a few words", Yves Sagnier (translated from French to English by B. Arcelin), last modified Dec. 13, 1999.

\* cited by examiner

*Primary Examiner*—Bernarr E. Gregory  
(74) *Attorney, Agent, or Firm*—David L. Terrell (57) ABSTRACT

A Mode-S transponder is provided for detecting synchronization phase reversal (SPR) signals. The transponder includes a receiver for receiving a Mode-S signal that contains a P6 pulse having a Mode-S data segment and an SPR signal therein. The transponder also includes a phase detector that detects a phase change between first and second states in the received Mode-S signal. The phase detector includes an SPR qualifier that determine whether, following a state change, the Mode-S signal remains at one of the first and second states for at least a predetermined minimum time sufficient to qualify as a detector enable signal.

20 Claims, 7 Drawing Sheets

DEVICE AND METHOD FOR SPR DETECTION IN A MODE-S TRANSPONDER

CROSS REFERENCE TO RELATED APPLICATIONS

This application is a continuation of Ser. No. 10/323,397, filed Dec. 18, 2002, and which is hereby incorporated by reference in its entirety now U.S. Pat. No. 6,786,445.

BACKGROUND OF THE INVENTION

The present invention generally relates to avionics electronics. More specifically, the present invention relates to methods and devices for qualifying Mode-S signals and for controlling reply by transponders to Mode-S interrogations.

A variety of transponders exist today for use with the Air Traffic Control Radar Beacon System (ATCRBS) and that support various communications protocols, such as Mode-C, Mode-A and Mode-S communication's protocols. ATCRBS ground stations, each have a rotating radar dish that transmits a beam having directional characteristics to transmit and receive information to and from aircraft within the relevant air space. The radar dish transmits over a common frequency to all of the aircraft. Each ATCRBS ground station also includes an omnidirectional antenna co-located with the directional radar dish. The omnidirectional antenna transmits, over a control frequency, among other things, side lobe suppression (SLS) signals which, as explained below in more detail, are synchronized to, and used in combination with, transmissions over the common frequency from the directional radar dish. The SLS signals are utilized to prevent aircraft outside of the beam from replying to transmissions generated by the directional radar dish. The aircraft transponders compare certain pulses transmitted from the radar dish over the common frequency with certain pulses transmitted from the omnidirectional antenna over the control frequency. The aircraft transponder determines whether to reply to received signals depending upon the relation between the compared pulses.

In general, an ATCRBS ground station sends approximately 250 to 450 Mode-S interrogations per second per radar frequency. In a ten second period, the radar dish will maintain a specific aircraft within its radar beam for no more than approximately 100 milliseconds which enables approximately 25 to 45 replies to be received by the ATCRBS ground station from each aircraft during each sweep of the radar dish.

To partially address the clutter of the air communication space created by excessive and unsolicited replies, the Mode-Select (Mode-S or discrete beacon address system, DBAS) was developed which permits active transmission of information to and from the aircraft. Mode-S transmissions have greatly reduced the transmission interference or garble previously experienced. In a Mode-S system, the ground station transmitter/receiver interrogates aircraft discretely based on specific 24 bit address assigned to each aircraft. The ground station transmits a Mode-S signal to each aircraft from which a reply is sought. The Mode-S protocol was developed to operate within the existing Mode-A or Mode-C environment.

The ground station produces a tag for each aircraft in its surveillance area through the use of two different methods in order to individually address each aircraft. In one method, a Mode-S SQUITTER is transmitted by the aircraft transponder pseudo randomly with a unique identification code for the aircraft embedded in the transmission. In the other method, a Mode-S ALL CALL signal is transmitted by the ground station. When the ground station transmits an ALL CALL signal, the Mode-S signal includes an interrogation command intended to elicit a reply from the transponders of every aircraft that receives the interrogation command. Each transponder that receives the ALL CALL signal replies by transmitting its unique 24 bit address.

The protocol for the Mode-S signals includes an identifying preamble containing two pulses, namely a P1 pulse and a P2 pulse, separated by a predetermined time interval. The P1 and P2 pulses are transmitted in accordance with a particular pulse width, modulation technique, and frequency. When transmitting a Mode-S interrogation, the ground station after transmitting the P1 and P2 preamble pulses, transmits a differential phase shift keyed (DPSK) data segment of predefined length, such as 56 or 112 bits or chips. The DPSK data segment contains, among other things, the interrogation command. The DPSK data segment includes 24 parity bits to provide a cyclic redundancy check (CRC). The DPSK data segment and CRC bits are embedded within a P6 pulse. The P6 pulse also contains a synchronization phase reversal (SPR) signal that precedes the first data bit/chip by a predetermined time set forth in the protocol.

The aircraft and ground station operate asynchronously with respect to one another since the aircraft transponder is driven by its own internal clock that operates independent of the clock used to drive the ground station transmitter/receiver. This is why, the aircraft transponder first synchronizes incoming received signals with the clock of the aircraft transponder before being able to read the DPSK data segment contained within the P6 pulse of the Mode-S signals. Signals received at the aircraft transponder represent a collection of signals transmitted from different sources, for different purposes and in varied formats. The aircraft transponder searches the collective incoming signals for various identifiers, such as Mode-A, Mode-C and Mode-S indicators. A Mode-S signal is identified by its preamble and more particularly by the pulse width and interval between P1 and P2 pulses. When the transponder detects a valid Mode-S preamble, the transponder next searches for the P6 pulse containing the DPSK data segment. To demodulate the DPSK data segment, the transponder must first be synchronized with the phase of the received Mode-S signal. The transponder achieves synchronization by first identifying the SPR signal contained within the P6 pulse. At the ground station, the P6 pulse is formatted such that the DPSK data segment is transmitted by a predefined time interval after the SPR signal.

At the aircraft, the transponder continuously monitors received signals and, upon receipt of valid P1 and P2 pulses, begins searching the received signal for a P6 data segment and once located, begins searching for the SPR signal. The transponder must detect the SPR signal within an allotted time window following the leading edge of the P6 pulse. Once the aircraft transponder identifies an incoming Mode-S preamble and locates the subsequent corresponding P6 signal and the SPR signal, the transponder is able to become synchronized with the DPSK data segment. If the SPR signal is not received within the allotted time window, the transponder determines that the received signal is not a Mode-S signal.

However, existing transponders have met with certain limitations. As noted above, when a ground station transmits a Mode-S ALL CALL interrogation, it is desirable for an aircraft to reply only when the aircraft is within the radar dish beam. It is preferable that aircraft outside of the radar dish beam not reply as such communications unduly garble the transmission airspace and are not properly receivable by the radar dish. In an attempt to limit aircraft replies only to aircraft within the radar dish beam, a protocol has been defined that must be satisfied by received signals at the aircraft transponder before replying. At the ground station, the radar dish transmits the P1, P2 and P6 pulses over the common frequency for a Mode S interrogation. The omnidirectional antenna also transmits a P5 pulse over the control frequency (as explained below in more detail). The P5 pulse is transmitted in all directions uniformly by the omnidirectional antenna. Thus, the strength or amplitude of P5 pulse received by a particular aircraft is independent of the angular relation between the omnidirectional antenna and the aircraft. In contrast, the P1, P2 and P6 pulses transmitted by the radar dish are directional and thus, signal strength is stronger within the beam formed by the directional radar dish. Hence, the strength or amplitude of P1 and P6 pulses received by an aircraft is dependent upon whether the radar dish beam is directed at the aircraft or not and where the aircraft is located within the beam (e.g., the center or edge).

While the P6 signal is strongest within the beam of the radar dish, aircraft located outside of the beam may still detect the P6 pulse, albeit at a lower signal strength. Consequently, when the ground station transmits an ALL CALL interrogation intended only for aircraft within the beam of the radar dish, aircraft outside of the beam may detect this P6 pulse. In an attempt to prevent replies from aircraft located outside of the beam of the radar dish, the omnidirectional antenna transmits the P5 pulse at a point in time and with a signal shape based upon the timing and shape of the SPR signal in the P6 pulse. The P5 pulse is transmitted to overlap the transmission by the radar dish of the SPR signal. The P5 pulse begins slightly before and continues slightly beyond the SPR signal. By timing and formatting the P5 pulse in this manner, the ground station attempts to overlap the P5 pulse with the SPR signal of the P6 pulse to achieve side lobe suppression (SLS) during Mode-S ALL CALL interrogations. Side lobe suppression is intended to prevent aircraft located outside the beam of the radar dish from responding to the Mode-S ALL CALL interrogation.

As noted above, the amplitudes of the P5 and P6 signals are different, such that the P5 pulse is much smaller than the P6 pulse for aircraft within the radar dish beam. In contrast, aircraft outside of the radar dish beam detect a much weaker P6 signal (due to its directivity). As P5 pulses are transmitted with equal strength in all directions, the relative strengths of P5 and P6 pulses detected by aircraft outside of the radar dish beam are much closer. In fact, the P6 pulse becomes so weak for aircraft outside of the radar dish beam that the P5 pulse becomes greater in strength. As the strength of a received P6 pulse decreases, the P5 pulse amplitude approaches and exceed the amplitude of the SPR signal. Since the P5 signal is much stronger than the SPR signal no phase transitions will be detected within the allocated SPR acceptance window, or thereby obliterating the SPR signal received by an aircraft located outside of the radar dish beam. In such cases, the aircraft is unable to detect an SPR signal within the collective received signal.

However, conventional transponders have experienced difficulty in correctly processing the P5 pulses and SPR signals in a manner that achieves proper cancellation. More specifically, the transponder develops the SPR timing based on the leading edge of the P6 or P2 signals which is detected through pulse amplitude demodulation. The SPR signal and therefore the P5 pulse is detected through a phase demodulator. These two demodulation methods and circuits are sampled through a series of logic circuits which cause the timing of the SPR window to be asynchronous. Consequently, the received P5 pulse (demodulated with DPSK demodulation) is asynchronous to the SPR acceptance window (based on amplitude demodulation) and therefore the P5 pulse jitters with respect to the SPR acceptance window. This problem is further caused by the phase changes in the rising edge of the P5 pulse. These phase changes will also cause the P5 pulse to jitter with respect to the SPR acceptance window. As the P5 pulse jitters with respect to the SPR acceptance window within the circuits of the transponder, this reduces the ability of the P5 pulse to cancel out the SPR signal. This timing error has caused conventional transponders to incorrectly identify SPR signals as valid, where such SPR signals should have been cancelled by the P5 pulse. Incorrect identification causes transponders to reply to ALL CALL interrogations not intended for the particular aircraft.

The tendency for a transponder to reply to unintended ALL CALL interrogations varies based upon the relative strengths of the received P5 and P6 pulses. This tendency has been recognized and led the establishment of standards to which transponders must comply. For instance, when the P6 pulse is at least 12 dB (decibels) greater than the P5 pulse in the received signal, the aircraft is more than likely within the radar dish beam and thus the transponder must reply. If the P6 pulse is 6 dB or greater than the P5 pulse (but less than 12 dB greater than the P5 pulse), then the aircraft is potentially along the edge of the radar dish beam and thus the transponder is required to reply 95% of the time. When the P6 pulse is at least 3 dB greater than the P5 pulse, (but less than 6 dB greater than the P5 pulse), the aircraft is more than likely outside of the beam of the radar dish and the transponder is expected to only reply 50% of the time. When the P5 pulse is 3 dB or greater than the P6 pulse, the aircraft is almost certainly outside of the beam of the radar dish and thus the transponder must reply less than 1% of the time. These broad standards are used as benchmarks for qualifying transponders.

Conventional transponders experiencing the internal timing problems discussed above have difficulty in satisfying these reply standards. A need remains for an improved transponder able to more accurately discriminate SPR signals from noise, to avoid phase shifts between the SPR signal and P5 pulse in the received signal, and to better satisfy the reply standards provided by the ATCRBS system. It is an object of certain embodiments of the present invention to meet one or more of these needs and to meet other needs that will become apparent from the present application.

BRIEF SUMMARY OF THE INVENTION

Certain embodiments provide a Mode-S transponder subsystem for detecting sync phase reversal (SPR) signals. The subsystem includes a receiver for receiving a Mode-S signal containing at least a P6 pulse containing an SPR signal followed by a Mode-S data segment. The subsystem further includes a phase detector detecting changes in the phase of the P6 pulse. The phase detector includes an SPR qualifier that determines whether changes in the phase have at least a predefined minimum length that is sufficient to qualify a phase change as a detector enable signal. The SPR qualifier may include a series of state latches latching the states of the P6 pulse at consecutive points along the P6 pulse to identify a length of time at which the P6 pulse remains at one phase. The SPR qualifier may also include logic gates that determine when a predefined number of consecutive points along the P6 pulse have a common state. The logic gates then generate a detector enable signal that enables the phase detector to operate when the P6 pulse remains at a common state for the predefined number of consecutive points.

Certain embodiments provide a transponder that includes a receiver for receiving air traffic communication signals from an Air Traffic Control Radar Beacon System (AT-CRBS). A transponder includes a processor that analyzes the air traffic communications (ATC) signal to identify a preamble segment corresponding to a predefined protocol for one of several known modes of communication. A demodulator is provided for demodulating the air traffic communication signal and outputting a data segment formatted in accordance with the predefined protocol. A detection module is included to synchronize outputs of the processor and the demodulator. The detection module identifies a synchronization pulse embedded within the data segment based in part upon a length of the synchronization pulse. A CPU processes the data segment once the synchronization pulse is identified.

The demodulator may perform analog or digital DPSK demodulation or some form of demodulation other than DPSK. The transponder may be a diversity transponder that includes first and second antenna connected to corresponding first and second processors and first and second demodulators, respectively. The transponder selects one of the first and second antenna for use based upon one of several criteria, such as reception strength and the like. The modes of operation may be, among others, Mode-A, Mode-C and Mode-S. The detection module may include an SPR qualifier that determines whether changes in state included in the synchronization pulse are maintained for at least a predetermined minimum length of time sufficient to qualify a particular change in state as a detector enable signal for a Mode-S signal.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentality shown in the attached drawings.

DETAILED DESCRIPTION OF THE INVENTION

Figure 1:
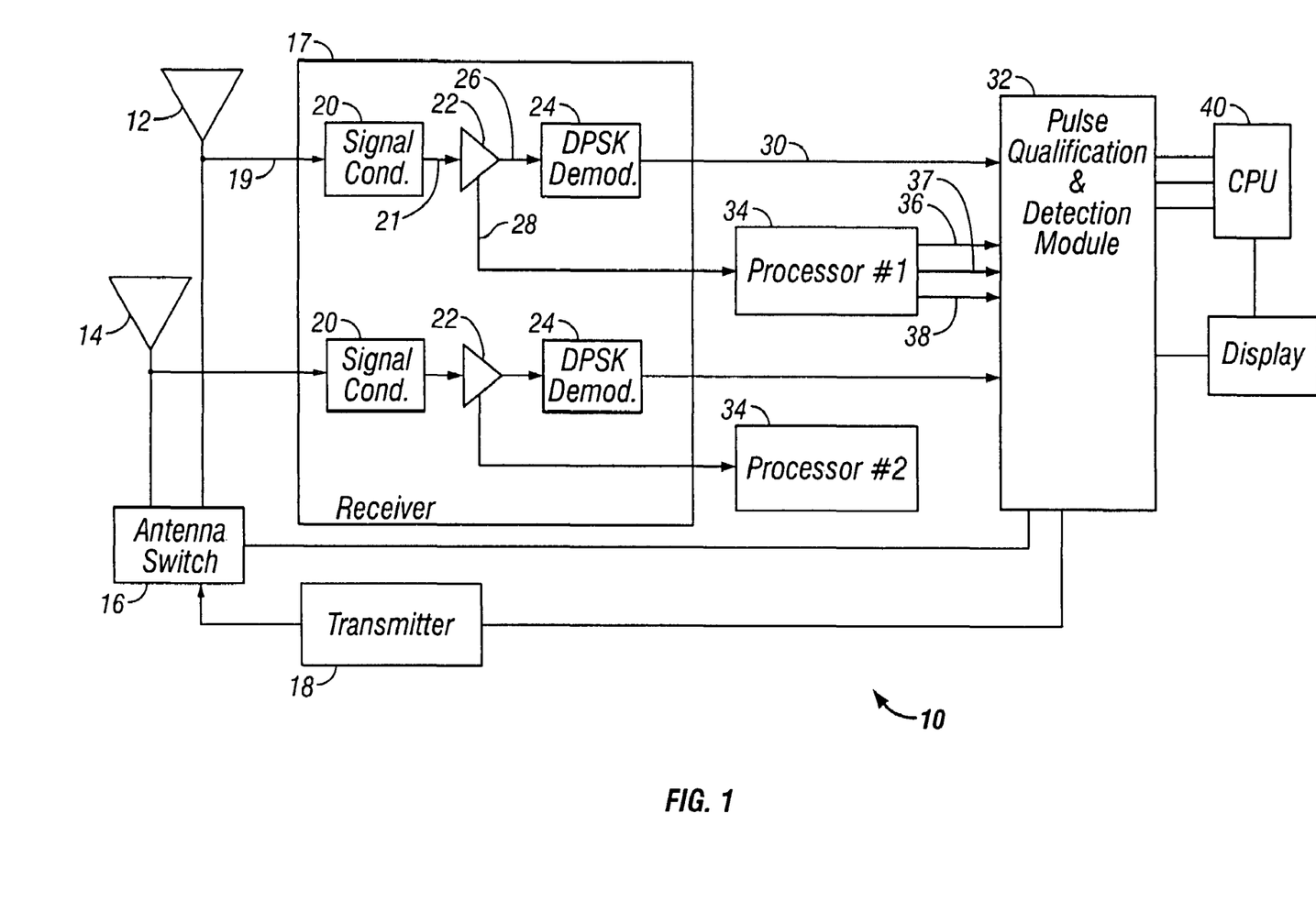
FIG. 1 illustrates a block diagram of a Mode-S transponder formed in accordance with an embodiment of the present invention.

FIG. 1 illustrates a block diagram of a Mode-S transponder 10 formed in accordance with an embodiment of the present invention. The transponder 10 represents a diversity transponder in that it may be connected to first and second antenna 12 and 14 located on the top and bottom sides of an aircraft. One of the top and bottom antenna 12 and 14 is selected for use based upon one or more of several criteria such as received signal strength and which signal was received first. An antenna switch 16 selects one of the top and bottom antenna 12 and 14 based upon these criteria. A transmitter 18 outputs signals to be transmitted from the selected one of the top and bottom antenna 12 and 14. The receiver 17 communicates with processors 34 and a pulse qualification and detection module 32.

The top and bottom antenna 12 and 14 are connected to identical parallel receive frequencies, only one of which is described below in detail. Received signals 19 from the top and bottom antenna 12 and 14 are supplied to a receiver 17 having signal conditioning circuits 20 which process the received signals in an analog or digital format. By way of example, the signal conditioning circuit 20 may receive an analog signal at a high frequency, filter the signal and down convert it to a lower or intermediate frequency. The signal conditioning circuitry may perform this down conversion through the use of a variety of known circuits. For example, the signal conditioning circuit 20 may include a single conversion mixer which combines the received signal with a reference signal such as from a local oscillator or synthesizer. By way of example, a 1,030 MHz signal may be mixed with a 970 MHz reference signal to produce a 60 MHz signal. Optionally, multiple mixers may be used to down convert the received signal to a first intermediate signal that is then in turn down converted to the lower 60 MHz frequency that is output from the signal conditioning circuit 20. Optionally, the signal conditioning circuit 20 may simply represent a band pass filter that does not necessarily down convert the frequency of the received signal.

RF signal 21 is output from the signal conditioning circuit 20 is supplied to a log amplifier 22 The log amplifier 22 outputs an amplitude limited signal 26 as the down converted frequency (e.g. 60 MHz) to the DPSK demodulator 24. By way of example only, the log amplifier 22 may add a fixed amount of gain to the incoming signal, such as 80 dB of gain to boost the signal before being supplied to the DPSK demodulator 24. The amplitude limited signal 26 may still represent an analog signal. The log signal 28 represents a pulse having a width equal to the width of the RF signal 21 burst or pulse supplied from the signal conditioning circuit 20. The log signal 28 has an amplitude maintaining a logarithmic proportion to the amplitude of the RF signal 21 from the signal conditioning circuit 20. By way of example, the RF signal 21 and log signal 28 may have a length of approximately 0.8 usec. The amplitude of the log signal 28 may vary 20 millivolts per 1 dB of change in the amplitude of the RF signal 21.

Figure 2:
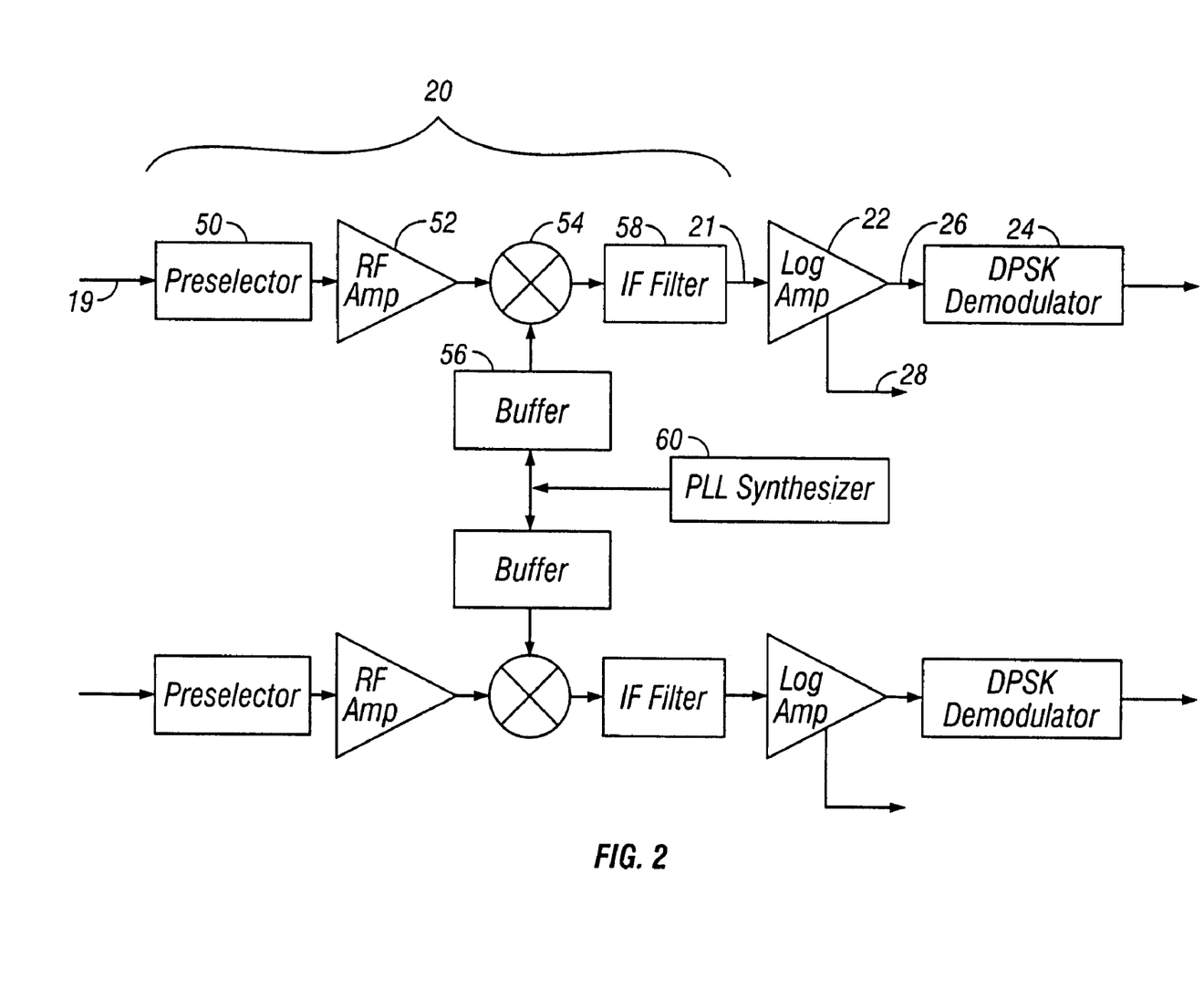
FIG. 2 illustrates a block diagram of a receiver formed in accordance with an embodiment of the present invention.

FIG. 2 illustrates a more detailed block diagram of the receiver 17. The signal conditioning circuit 20 includes a preselector 50 which represents a band pass filter centered at the pass band of the receive signal 17 (e.g. 1030 MHz). The preselector 50 filters out unwanted signals. The output of the preselector 50 is passed to an RF amplifier 52 that boosts the filtered signal which is then passed to a mixer 54 that combines the received signal 19 with a reference signal passed from a buffer 56. The buffer 56 holds a reference signal produced by a phase lock loop synthesizer 58. The output of the mixer 54 is passed to an intermediate frequency filter 56 which further filters the mixed signal to produce the RF signal 21 passed to the log amplifier 22. The receiver 17 includes parallel frequencies which receive RF signals from top and bottom antenna 12 and 14 (FIG. 1). While only one frequency is described above in connection with FIG. 2, it is to be understood that the other frequency will operate in the same manner in the event that the bottom antenna 14 is selected.

The DPSK demodulator 24 detects phase changes in the amplitude limited signal 26. The DPSK demodulator 24 may operate upon an analog or digitized amplitude limited signal 26. The DPSK demodulator 24 outputs a phase change signal 30 representative of changes in the phase of the amplitude limited signal 26. The DPSK demodulator 24 may be implemented in a variety of manners. In the present embodiment, the DPSK demodulator 24 operates upon and produces signals at a frequency lower than that of the received signal 19. Optionally, the DPSK demodulator 24 may operate upon an amplitude limited signal 26 and produce a phase change signal 30 at a frequency equal to that of the received signal 19 (e.g. 1030 MHz). If operated at this higher frequency, the pulse qualification and detection module 32 would simply be operated at an over sampling rate in accordance with the higher frequency phase change signal 30.

One manner in which the DPSK demodulator 24 may be implemented includes a phase locked loop that tracks the phase of the amplitude limited signal 26, and as it changes, the frequency of the voltage controller oscillator (VCO) is switched. When the VCO switches frequency, it in turn causes a phase detector to flip between states (e.g. from a 1 to a 0 or vice versa) which is representative of a phase change in the incoming amplitude limited signal 26.

Alternatively, the DPSK demodulator 24 may be implemented using a multiplier/divider/comparator circuit configuration, in which the frequency of the amplitude limited signal 26 is first multiplied by 2, lowpass filtered and then divided by 2. The remainder signal portion from the division by 2 of the filtered signal is disregarded and the whole signal portion of the division is then compared with the incoming amplitude limited signal 26. To provide a more specific example, it may be assumed that the amplitude limited signal 26 has a frequency of 60 MHz. The 60 MHz signal is multiplied by 2, and the resulting 120 MHz signal is lowpass filtered to remove phase changes. Then the 120 MHz filtered signal is divided by 2, and the resulting 60 MHz signal does not include phase changes previously included within the original 60 MHz amplitude limited signal 26. The 60 MHz filtered signal without phase changes is then compared with the original 60 MHz amplitude limited signal 26 (which includes phase changes). The output of the comparison is indicative of the phase differences between the original and filtered 60 MHz signals, thereby forming the phase change signal 30. The frequency of the phase change signal 30 output from the DPSK demodulator 24 is at a reduced frequency, such as at base band (e.g. 4 MHz), as compared to the amplitude limited signal 26.

A further alternative method for implementing the DPSK demodulator 24 may include a delay/comparator circuit in which the amplitude limited signal 26 is first delayed by a predetermined time period and the delayed signal is compared with the new incoming amplitude limited signal 26 to detect phase changes therebetween.

Returning to FIG. 1, the log signal 28 from the log amplifier 22 is supplied to a processor 34 that performs several functions. More specifically, the processor 34 analyzes the log signal 28 to determine whether the log signal 28 exceeds a minimum threshold level (MTL) (e.g., −75 dB). If not, the processor 34 outputs a low value for the pulse amplitude signal 37 which instructs the detection module 32 to disregard the log signal 28 and phase change signal 30. By way of example comparators may be used to compare the log signal 28 with a reference signal representing the minimum threshold level (MTL). The output of the comparison(s) is low when the log signal 28 is below the MTL.

In addition, the processor 34 shapes pulses within the log signal 28, such as the P1, P2 and P6 pulses. For example, the processor 34 may detect the peak of each pulse in the log signal 28. The processor 34 produces a pulse in the pulse amplitude signal 37, having an amplitude equal to, or at a predetermined level below (e.g., 0.5 dB) each detected peak. The processor 34 also produces a pulse in the pulse width signal 36, having leading and trailing edges corresponding with points in the log signal 28 that rise above and fall below, respectively, a threshold. The threshold is set at a predetermined level (e.g. 3 dB) below the peak. The pulse width and amplitude signals 36 and 37 are output to the pulse qualification and detection module 32.

In addition, the processor 34 may conduct ATCRBS rate limiting in which it determines when more than a maximum acceptable number of ATCRBS interrogations are being received in a given time period over the log signal 28. When the processor 34 determines that the number of interrogations is excessive, the processor 34 provides a rate limiting signal 38 to the pulse qualification and detection module 32.

The pulse qualification and detection module 32 (hereafter detection module 32) may be formed from a field programmable gate array (FPGA) that is programmed to carry out various functions including those explained below. The detection module 32 synchronizes the phase change signal 30 from the DPSK demodulator 24 with the pulse width and amplitude signals 36 and 37 output from the selected processor 34. Synchronization is needed since these signals have passed along different processing paths and become misaligned within the receiver 17 and processor 34. In addition, the detection module 32 qualifies the signals output from the processor 34 based on width and amplitude. More specifically, the detection module 32 identifies pulses in the pulse width signal 36 that may qualify as P1 pulses, along with the corresponding amplitude on the pulse amplitude signal 37. The detection module 32 then begins monitoring the pulse width signal 36 for a potential P2 pulse which, to be valid, must occur a predetermined distance after the leading edge of the P1 pulse and have a predetermined pulse width. The detection module 32 determines that the potential pulses are valid P1 and P2 pulses when they are in the correct locations and have the correct widths and amplitudes relative to one another.

The detection module 32, upon detecting valid P1 and P2 pulses, also begins an "SLS period," during which ATCRBS signal detection is disabled. During the SLS period, the detection module 32 does not analyze, nor look for ATCRBS signals. In addition, once valid P1 and P2 signals are identified, the detection module 32 also begins looking for a potential P6 pulse. A valid P6 pulse will begin at a predefined timing interval following the leading edge of the P2 pulse. Once the detection module 32 identifies a potential P6 pulse, the detection module 32 then attempts to validate the P6 pulse by monitoring the phase change signal 30 and searches for a valid SPR signal. In order to be a valid P6 pulse, an SPR signal must begin a predetermined time following the leading edge of the P6 pulse. Once a valid SPR signal is identified, the detector module 32 uses the SPR signal to synchronize to the center of each chip or data bit in the DPSK data segment. The detector modulator 32 then supplies the DPSK data to the CPU 40 which processes the data content.

Figure 3:
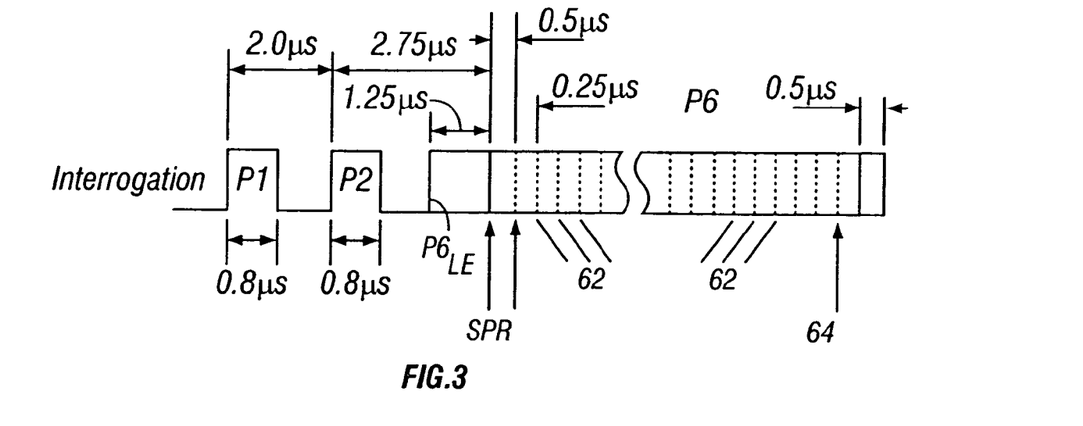
FIG. 3 illustrates a timing diagram associated with a Mode-S protocol.

FIG. 3 illustrates an exemplary timing diagram, to which P1, P2 and P6 pulses may conform when transmitted from a ground station. The detection module 32 qualifies P1, P2 and P6 pulses based upon the timing diagram illustrated in FIG. 3. The pulse width and intervals between pulses are merely exemplary and may be modified. In the example of FIG. 3, the P1 and P2 pulses are 0.8 usec in width and have leading edges separated by two usec. The leading edge of a P6 pulse identified at point $P6_{LE}$ is spaced 1.5 usec beyond the leading edge of the P2 pulse and 3.5 usec beyond the leading edge of the P1 pulse. A sync phase reversal (SPR) signal occurs 1.25 usec after the leading edge of the P6 pulse and is followed 0.5 usec by the first data chip. Each data chip is 0.25 usec in width. A series of dashed lines denoted by reference numeral 62 represent points at which the phase of each data chip may change depending upon the data content. Element 64 represents the last data chip which ends 0.5 usec before the end of the P6 pulse.

Figure 4:
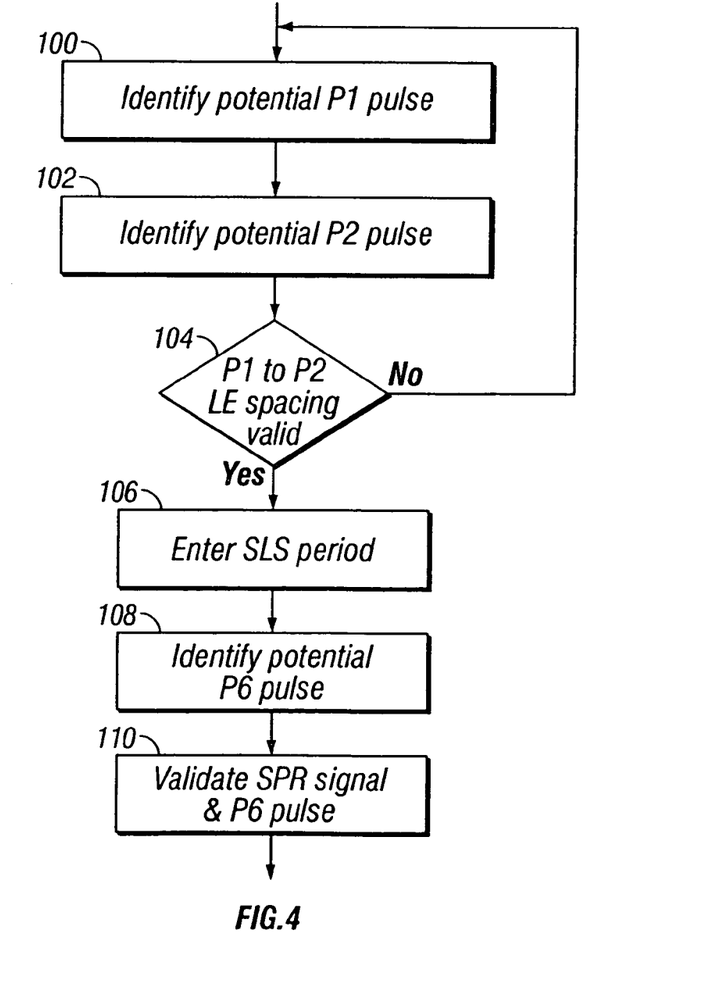
FIG. 4 illustrates a flow chart of the steps carried out by a detection module formed in accordance with an embodiment of the present invention.

FIG. 4 illustrates a block diagram of the processing sequence carried out by the detection module 32 in order to identify and respond to an ALL CALL interrogation initiated with valid P1 and P2 pulses in accordance with the timing diagram of FIG. 3. The detection module 32 initially (at step 100) begins monitoring the pulse width signal 36 (FIG. 1) in search of a potential P1 pulse. When the detection module 32 detects, in the pulse width signal 36, a pulse having a width of approximately 0.8 usec, the pulse is identified as a potential P1 pulse at step 100. At step 102, the detection module 32 begins to look for a potential P2 pulse. When the pulse width signal 36 (FIG. 1) produces another pulse having a width of approximately 0.8 usec, the detection module 32 identified the pulse as a potential P2 pulse. Next, the detection module 32 determines the time interval between leading edges of the potential P1 and P2 pulses identified at steps 100 and 102. If the interval between the leading edges is approximately 2 usec, the detection module 32 validates the potential pulses identified at steps 100 and 102 as actual P1 and P2 pulses. Otherwise, processing returns to step 100. If valid, processing passes to step 106 at which the detection module 32 initiates an SLS period during which the transponder 10 (FIG. 1) no longer looks for ATCRBS signals.

At step 108, the detection module 32 begins searching for a potential P6 pulse by initiating a P6 detector within the detection module 32. The detection module 32 identifies the potential P6 signal by searching for its leading edge within a specific time window following the leading edge of the P2 pulse. Once a pulse is identified to have its leading edge occurring in the correct time window, the pulse is considered a potential P6 pulse and the detection module 32 begins searching for an SPR signal at step 110. The detection module 32 carries out steps 100–108 based upon the pulse width signal 36 and pulse amplitude signal 37. At step 110, the detection module 32 monitors the phase change signal 30 output from the DPSK demodulator 24. The detection module 32 identifies a valid SPR signal when the phase change signal 30 changes state in the appropriate time window following the leading edge of the P6 pulse (such as in accordance with the time shown in FIG. 3). Once the SPR signal is detected, the detection module 32 passes the DPSK data to the CPU 40 to be processed.

Figure 5:
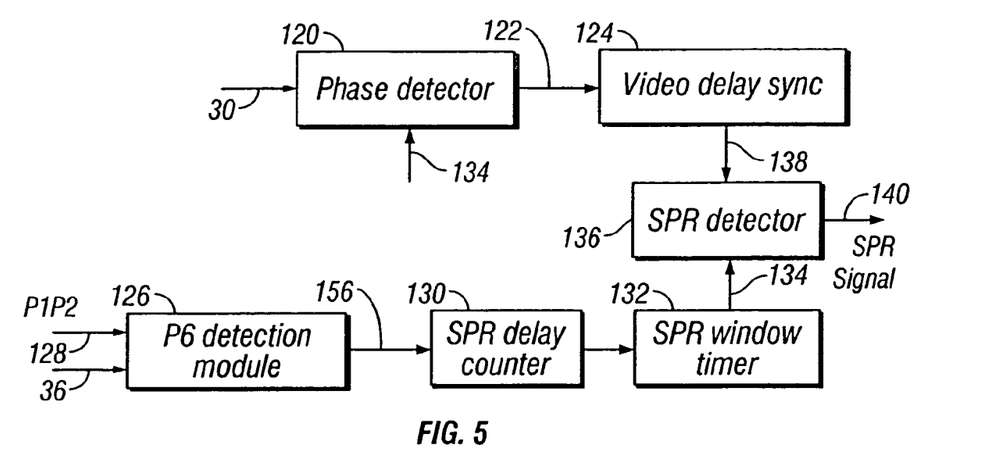
FIG. 5 illustrates a block diagram of the detection module formed in accordance with an embodiment of the present invention.

FIG. 5 illustrates a block diagram of the functions performed by the detector module 32 during steps 108 and 110 (FIG. 4) to validate a P6 pulse and an SPR signal. The detector module 32 may be implemented using a variety of hardware and software components, such as a field programmable gate array (FPGA). In the event that the detector module 32 is implemented using one or more FPGAs, the block diagram of FIG. 5 represents macros programmed into the FPGA(s).

As shown in FIG. 5, a phase detector 120 receives the phase change signal 30 from the DPSK demodulator 24 (FIG. 1). The phase detector 120 analyses each phase change in the phase change signal 30 and determines whether to pass it along line 122 to the video delay sync 124. The video delay sync 124 may represent a delay line that delays the output of the phase detector 120 by an amount necessary to align it with the pulse width signal 36. For example, the video delay sync 124 may delay the output of the phase detector 120 by 250 nsec or the like. The video delay sync 124 corrects for variations in the processing path between the DPSK demodulator 24 and the processor 34. The video delay sync 124 may be programmable to different discrete delays, such as 0–250 nsec.

The detector module 32 also includes a P6 detection module 126 which receives the pulse width signal 36 and a P1P2 confirmation signal 128. The P1P2 confirmation signal 128 is produced internally within the detection module 32 at step 104 (FIG. 4) once valid P1 and P2 pulses are identified as having the correct pulse width, leading edge spacing and amplitudes (as discussed above).

Once the P6 detection module 126 receives a valid P1P2 confirmation signal 128, it begins monitoring the pulse width signal 36 for the leading edge of a P6 signal. The P6 detection module 126 validates a P6 pulse when the pulse width signal 36 changes states from a low state to a high state within a predetermined time window following the leading edge of the P2 pulse. Once a valid P6 pulse is identified, the P6 detection module activates an SPR delay counter 130 which counts off a predetermined time interval between the leading edge of the P6 pulse and beginning of an SPR window. In the example of FIG. 3, the SPR signal occurs 1.25 usec after the leading edge of the P6 pulse. Thus, an SPR window is defined during which the SPR signal may occur. Once the SPR delay counter 130 counts down this delay period it activates the SPR window timer 132 which produces an SPR enabled signal 134 that drives an SPR detector 136. The SPR detector 136 monitors the output on line 138 from the video delay sync 124 in search of a valid SPR signal which is then output on line 140.

Figure 6:
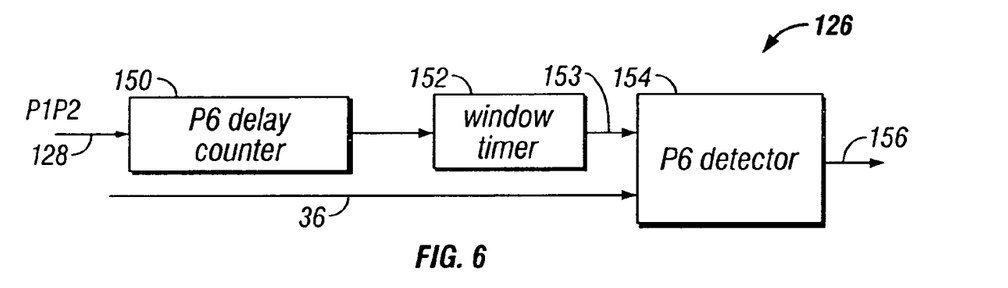
FIG. 6 illustrates a block diagram of a P6 detection module formed in accordance with an embodiment of the present invention.
Figure 7:
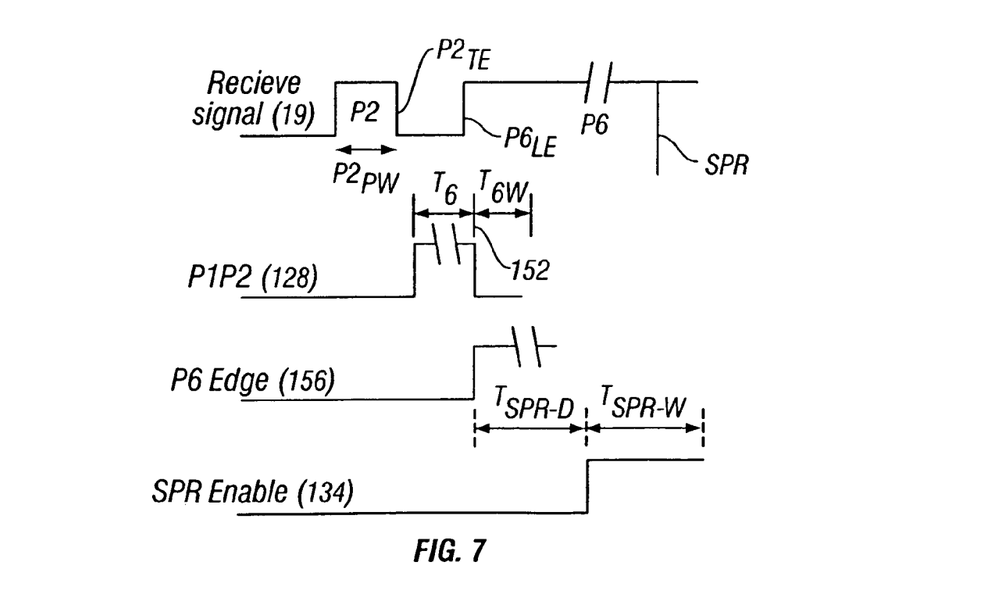
FIG. 7 illustrates a timing diagram associated with the operation of the detection module of FIG. 5.

FIG. 6 illustrates the P6 detection module 126 in more detail. The P6 detection module 126 is explained in connection with the timing diagram in FIG. 7. FIG. 7 illustrates an exemplary timing relation between a P2 pulse having a width $P2_{PW}$ and a P6 pulse with a leading edge $P6_{LE}$. A P6 delay counter 150 (FIG. 6), upon receiving a valid P1P2 confirmation signal 128 begins a timer that times out after a time $T_6$. As shown in FIG. 7, the time interval $T_6$ begins at the leading edge $P1P2_{LE}$ of the P1P2 pulse and ends at a point in time before the leading edge of the P6 pulse $P6_{LE}$. At the end of time $T_6$, the P6 delay counter 150 activates a window timer 152 which in turn enables the P6 detector 154. The window timer 152 supplies an enable signal 153 to the P6 detector 154 for a P6 window $T_{6W}$ (FIG. 7). The P6 window $T_{6W}$ represents a time period during which a P6 pulse leading edge should be detected by the P6 detector 154 to be valid. While the enable signal 153 is high, the P6 detector 154 monitors the pulse width signal 36 for a transition from a low to a high state. If the pulse width signal 36 remains low or switches from a high to a low state during the time window $T_{6W}$, the P6 detector 154 determines that the potential P6 pulse was not valid. Alternatively, if the P6 detector 154 detects a transition in the pulse width signal 36 during the P6 window $T_{6W}$, from a low state to a high state, the P6 detector 154 outputs a valid P6 pulse signal 156 (after which flow passes from step 108 in FIG. 4 to step 110).

Returning to FIG. 5, the valid P6 pulse signal 156 is output by the P6 detection module 126 and used to activate the SPR delay counter 130. The SPR delay counter 130 then initiates a timer for an SPR delay $T_{SPR-D}$ (FIG. 7) representing a delay beginning at the leading edge of the P6 pulse. Once the SPR delay $T_{SPR-D}$ times out, the SPR delay counter 130 enables an SPR window timer 132 which initiates a window during which the SPR detector 136 searches for a valid SPR signal. In FIG. 7, the SPR window is denoted by $T_{SPR-W}$. Once the SPR enable signal 134 goes high, the SPR detector 136 begins monitoring line 138 for a valid SPR signal. The SPR window $T_{SPR-W}$ defines the interval during which an SPR signal should occur to be valid. If an SPR signal is detected during the SPR window $T_{SPR-W}$ a valid SPR signal is output on line 140.

Figure 8:
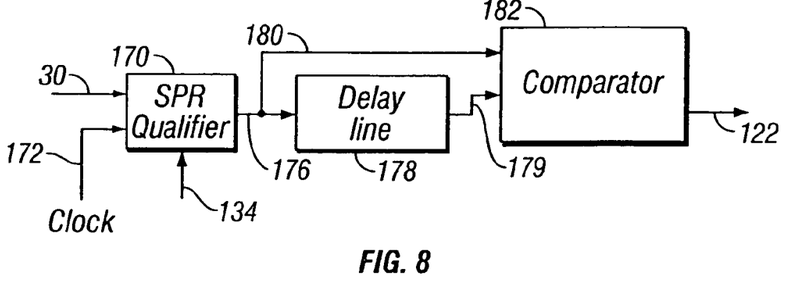
FIG. 8 illustrates a block diagram of a phase detector formed in accordance with an embodiment of the present invention.

FIG. 8 illustrates a more detailed functional block diagram of the phase detector 120. The phase detector 120 includes an SPR qualifier 170 which receives the phase change signal 30 from the DPSK demodulator 24 (FIG. 1). The SPR qualifier 170 also receives a clock signal 172 and an SPR enable signal 134 that directs the SPR qualifier 170 to analyze and qualify phase changes received over the phase change signal 30. When the SPR enabled signal 134 is low, the SPR qualifier 170 does not analyze, nor attempt to qualify, incoming phase change signals 30 and instead passes all phase changes to its output at line 176. When the SPR enable signal 134 is high, the SPR qualifier 170 analyzes the changes in state in the phase change signal 130 and the length of time during which each state is held constant. When the SPR enabled signal 134 is high, the SPR qualifier 170 only passes state changes in the phase change signal 30 that have at least a predetermined length.

The term "length" when used herein throughout to describe "phase" or "state" refers to the length of time, following a phase or state change, for which the new phase or state is maintained constant.

The SPR qualifier 170 qualifies detector enable signals conveyed over the phase change signal 30 by first determining that the detector enable signal is at least a predetermined minimum width. For example, the minimum width for the SPR signal may be determined to be 50 or 100 nsec. Hence, the SPR qualifier 170, when enabled, monitors the phase change signal 30 for state changes that remain in a changed state for at least the predetermined minimum length of time. If a state change does not remain constant for this minimum length of time, the SPR qualifier 170 disregards it and does not pass the signal to line 176.

State changes passed on line 176 are held in a delay line 178 for a predetermined period of time. The state changes on line 176 are also directly provided along line 180 to a comparator 182. The comparator 182 compares the output of the delay line 178 and the output on line 180 to identify state differences therebetween. When the comparator 182 detects a state difference, it outputs a state change signal on line 122 (which is delivered to the video delay sync 124 in FIG. 5). The comparator 182 may include an Exclusive OR gate that compares the two inputs in order to determine whether a phase change occurs between the delayed and undelayed signals. When a phase change occurs, the comparator 182 outputs a high state at line 122, otherwise it outputs a low state. The output of the comparator 182 represents data bits ultimately supplied to the CPU 40 (FIG. 1).

Figure 9:
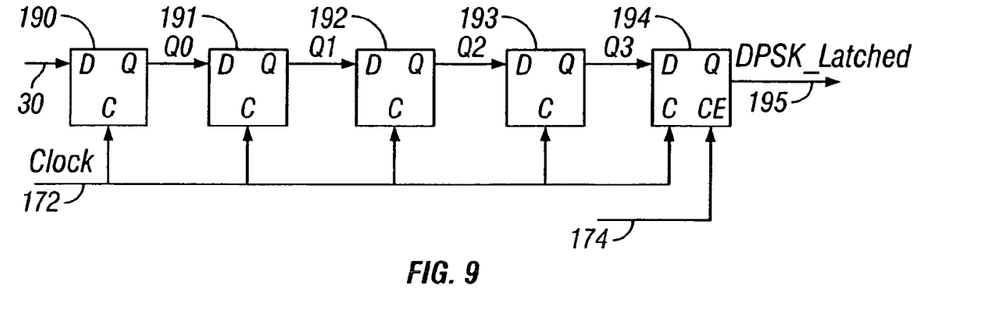
FIG. 9 illustrates a block diagram of a lead portion of a sync phase reversal qualifier formed in accordance with an embodiment of the present invention.
Figure 10:
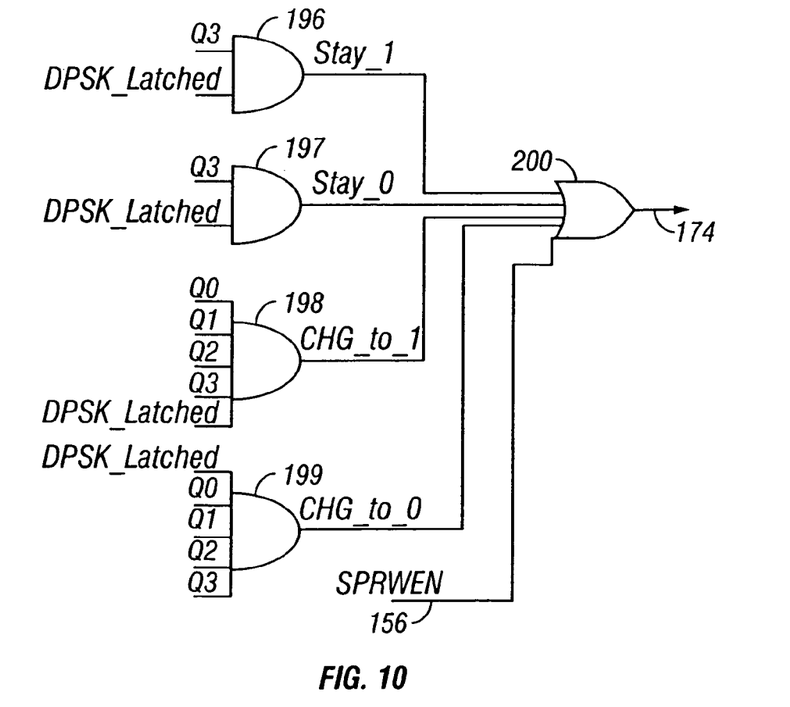
FIG. 10 illustrates a block diagram of a trailing portion of a sync phase reversal qualifier formed in accordance with an embodiment of the present invention.

FIGS. 9 and 10 illustrate more detailed block diagrams of the SPR qualifier 170. In FIG. 9, a series of D flip flops 190–194 are cascaded with one another and driven by clock signal 172. The final D flip flop 194 includes a chip enable input which is driven by a detector enable signal 174 (which represents a detector enable signal). The D flip flops 190–194 are controlled to sample the phase change signal 30 at predefined intervals determined by the clock 172. For example, the D flip flop 190 may sample the phase change signal 30 every 25 nsec. The outputs of D flip flops 190–193 are identified as Q0–Q3, respectively. The output of D flip flop 194 is designated as a DPSK_latched signal 195 (DPSK_latched). The Q0–Q3 and DPSK_latched signal 195 retain and correspond to states of the phase change signal 30 at a series of successive clock cycles defined by the clock 172. The signals Q0–Q3 represent states of the phase change signal at four consecutive time intervals (e.g., at 25 nsec). The DPSK_latched signal 195 represents the state of the phase change signal during the time interval immediately preceding the signal Q3. The Q0–Q3 and the DPSK_latched signal 195 are supplied to a series of logic gates illustrated in FIG. 10 to produce the detector enable signal 174 which in turn enables or disenables the D flip flop 194 (FIG. 9). The detector enable signal 174 is always enabled outside of the SPR window, $T_{spr-w}$. During the SPR window, $T_{spr-w}$, the detector enable signal 174 is disabled only when a phase transition is less than 100 nsec wide.

As shown in FIG. 10, a series of AND gates 196–199 receive, as inputs, various combinations of the Q0–Q3 signals and DPSK_latched signal 195. The outputs of AND gates 196–199 are supplied to an OR gate 200 which produces the detector enable signal 174. The AND gate 196 outputs a high state whenever the DPSK_latched signal 195 and the Q3 signals are both high which indicates that the phase change signal 30 maintained a high state between two successive clock cycles. The AND gate 197 identifies the opposite of AND gate 196, namely when the phase change signal 30 maintains a low state between two successive clock cycles. The AND gates 196 and 197 determine that no phase changes have occurred. Therefore it is OK to pass the phase data on to the delay line 178 and comparator 182. The AND gate 198 identifies when the phase change signal 30 changes from a low state during one clock cycle to a high state and remains at a high state for four successive clock cycles. The AND gate 199 identifies when the phase change signal 130 changes from a high state during one clock cycle to a low state and remains at the low state for four successive clock cycles. Hence, for 25 nsec clock cycles, the AND gate 198 identifies when the phase change signal 30 changes to a high state for at least 100 nsec. Similarly, the AND gate 199 identifies when the phase change signal 30 changes to a low state for at least 100 nsec. The circles at select inputs to gates 196–200 indicate that the corresponding input signal has been inverted before passing to the corresponding gate 196–200.

The SPR qualifier 170 disregards state changes in the phase change signal 30 that have a length less than the time interval established by D flip flops 190–194. The time interval through D flip flops 190–194 represents a minimum length of time that the state should remain constant following a state change to qualify as a detector enable signal. In the example of FIG. 9, the state should remain constant for at least 100 nsec. However, this time may be shortened, such as to 50 nsec, or lengthened, such as to 150 nsec, by using more or few flip flops and/or by varying clock signal frequency. Other logic may be used besides flip flops, AND and OR gates.

The OR gate 200 will output a high detector enable signal 174 when certain conditions are met. First, a valid P6 pulse signal 156 is low(albeit inverted at the input of the OR gate 200). When all of signals Q0–Q3 are high and the DPSK_latched signal 195 is low, this condition is detected by AND gate 198. AND gate 198 indicates that a leading edge of a state change from 0 to 1 is present at the time intervals corresponding to the outputs of D flip flops 193 and 194 and that the state remains a 1 for at least four clock cycles or time intervals.

Figure 11:
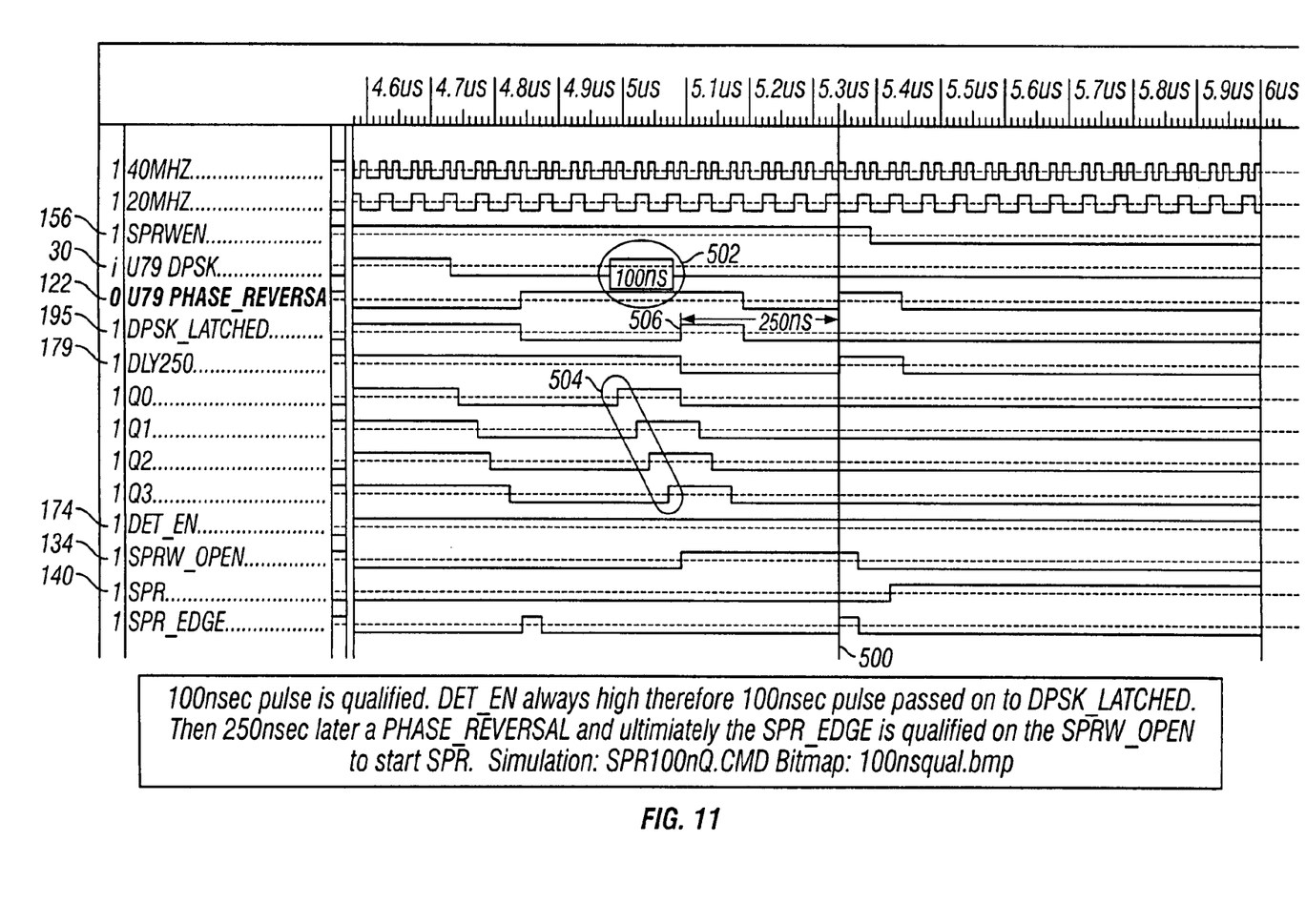
FIG. 11 illustrates an exemplary diagram for signals within the SPR qualifier during qualification of a detector enable signal in accordance with an embodiment of the present invention.
Figure 12:
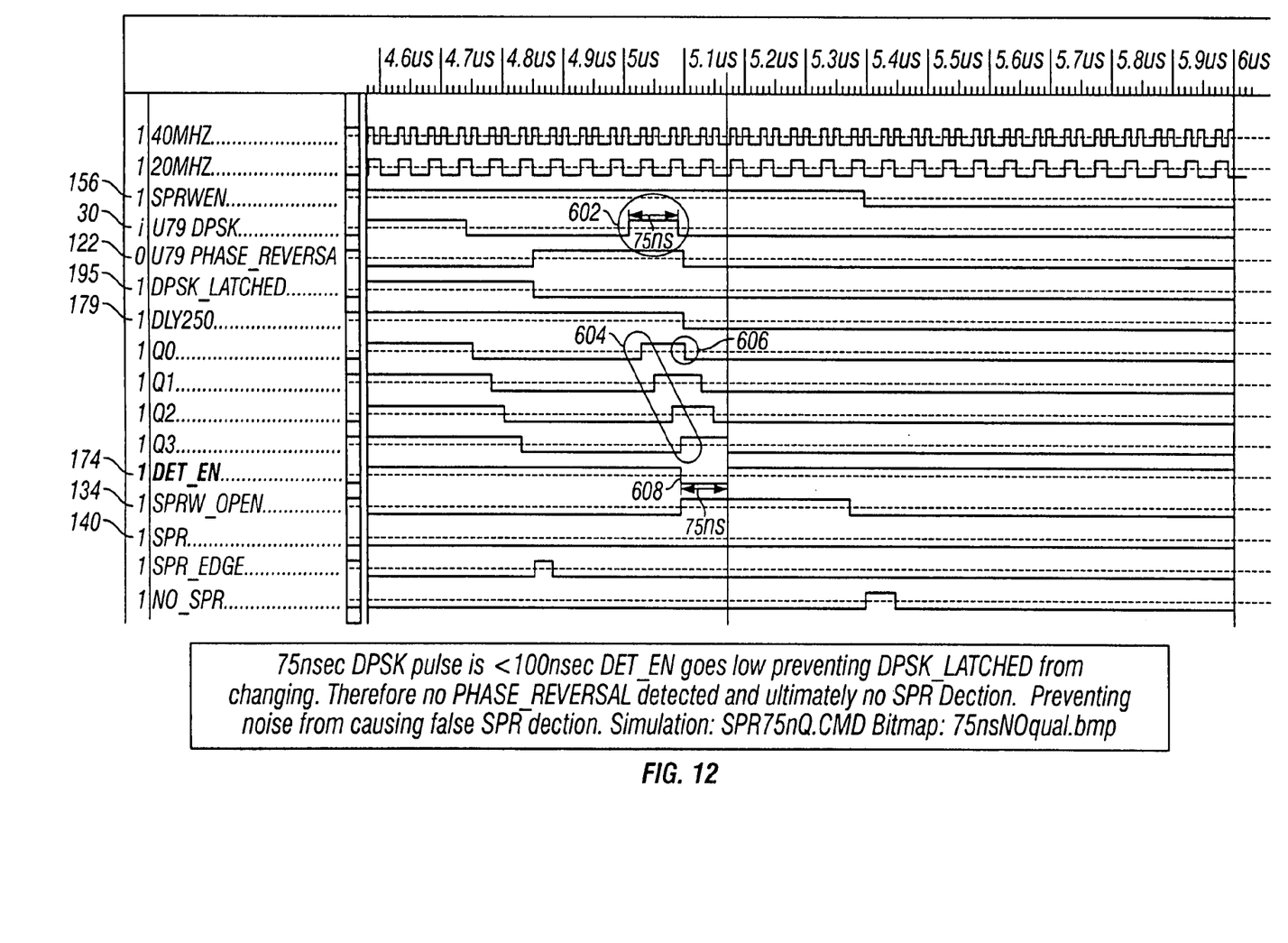
FIG. 12 illustrates an exemplary diagram of signals within the SPR qualifier during disqualifying a false SPR detection in accordance with an embodiment of the present invention.

Next, an exemplary operation of the SPR qualifier 170 will be described in connection with timing diagrams illustrated in FIGS. 11 and 12. FIGS. 11 and 12 illustrate timing diagrams for various signals within the SPR qualifier 170. The vertical axis denotes the various signals and the horizontal axis denotes time in microseconds. The signals illustrated in FIGS. 11 and 12 are as follows in vertically descending order, namely a 40 MHz reference signal, a 20 MHz reference signal, the SPR window enable (SPRWEN) signal (corresponding to the valid P6 pulse signal 156), the phase change signal 30 (DSPK), a phase reversal signal (PHASE_REVERSAL) 122, the DPSK_latched signal 195 (output from D flip flop 194), the delay line output (DLY 250) 179, the Q0–Q3 signals produced by the D flip flops 190–193 (Q0–Q3), the detector enable signal (DET_EN) 174, an SPR window open signal (SPRW_OPEN) 134, the SPR signal (SPR) 140, and the SPR edge signal (SPR_EDGE) (produced internal to the SPR detector 136 based on the signal on line 138 in FIG. 5).

FIG. 11 illustrates a 100 nsec pulse 502 that is qualified and passed. Once the DPSK_latched signal 195 is changed to a high state, 250 nsec later, the phase reversal signal 122 is qualified at the line denoted by reference numeral 500. Thereafter the SPR edge signal SPR_EDGE is qualified and the SPR window open signal SPRW_OPEN 134 is qualified to start the SPR signal 140.

With combined reference to FIGS. 9–11, an exemplary operation will be described in connection with the 100 nsec pulse 502. Once the leading edge of pulse 502 in the phase change signal 30 changes to a high state, the D flip flops 190–193 successively change to high states as denoted by the state changes 504 in the Q0–Q3 signals. The DPSK_latched signal 195 is low when Q3 goes high. Hence, the AND gate 198 (FIG. 9) outputs a high signal to indicate a change in the phase change signal 30 to a high state for 100 nsec. The OR gate 200 sets the detector enable signal 174 to a high state which enables the D flip flop 194. Thereafter, the DPSK_latched signal switches to a high state at clock cycle 506. In response, the detection module 32 searches for a valid SPR signal.

The example of FIG. 12 illustrates a timing diagram during which the phase change signal 30 maintains a high state only for 75 nsec (as denoted at pulse 602). In the present example, a 75 nsec pulse 602 is insufficient to qualify as a potential valid SPR signal. When the pulse 602 changes to a high state, the Q0–Q3 signals change to a high state as denoted at state changes 604. However, thereafter the pulse 602 changes to a low state. Consequently, the DPSK_latched signal 195 does not change to a high state since the Q0 signal returns to a low state at clock cycle 606. Accordingly, when the AND gate 198 (FIG. 9) compares the Q0–Q3 signals at the time associated with the state change 606, the Q0 signal is low, thereby causing the output of the AND gate 198 to remain low.

Since the pulse 602 is less than the desired 100 nsec minimum qualification length, the detect enable signal DET_EN 174 goes low at time 608 which prevents the DPSK_latched signal 195 from changing states. Therefore, no phase reversal is detected and the detection module 32 does not search for a detector enable signal. Hence, the SPR qualifier 170 (FIG. 8) prevents noise from causing false SPR detections.

The SPR qualifier 170 improves the accuracy of the analysis of the detection module 32. Hence, the detection module 32 exhibits improved reliability in determining whether a received signal is in fact a Mode-S signal that warrants reply. In fact, the reliability of the detection module 32 is so improved that it identifies SPR signals correctly in at least 99% of the received Mode-S signals in which the amplitude of the P6 pulse is at least 12 dB greater than the amplitude of the P5 pulse. Also, the detection module 32 is so improved that it identifies SPR signals in no more than 2% of the received Mode-S signals in which the amplitude of the P6 pulse is at least 3 dB less than the amplitude of the P5 pulse.

Further, the improved performance of the detection module 32 enables the receiver 17 to be fine tuned and/or optimized to reduce interference pulses. For example, the SPR qualifier 170 enables the parameter of the receiver 17 to be more precisely set such that each P6 pulse is analyzed sufficiently by the detection module 32 to identify the SPR signal correctly in at least 95% of the received Mode-S signals in which the amplitude of the P6 pulse is at least 6 dB greater than the amplitude of the interference pulse. In addition, the SPR qualifier 170 enables the parameters of the receiver 1 to be sufficiently refined such that each SPR signal is identified correctly in at least 65% of the received Mode-S signals in which the amplitude of the P6 pulse is at least 3 dB greater than the amplitude of the interference pulse.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a Mode-S transponder, a subsystem for detecting synchronization signals, comprising:

a receiver for receiving a transponder signal containing at least a first pulse containing a transponder data segment having an synchronization signal; and a phase detector for detecting a state change between first and second states, said state change corresponding to a change in phase of said transponder signal, said phase detector including a qualifier for determining whether, following said state change, said transponder signal remains at one of said first and second states for at least a predetermined minimum time.

2. The transponder subsystem of claim 1, wherein said qualifier further comprises a series of state latches latching states of said transponder signal at consecutive clock cycles along said transponder signal to identify a length of time at which said transponder signal remains at one of said first and second states.

3. The transponder subsystem of claim 1, wherein said qualifier further comprises logic gates determining whether said transponder signal includes a predefined number of consecutive clock cycles having a common one of said first and second states, said logic gates generating a detector enable signal enabling said phase detector when said first pulse has said common one of said first and second states for said predefined number of consecutive clock cycles.

4. The transponder subsystem of claim 1, wherein said qualifier qualifies said transponder data segment when said transponder data segment includes a detector enable signal maintaining a constant state for at least 50 nsec.

5. The transponder subsystem of claim 1, wherein said qualifier qualifies said transponder data segment when said transponder data segment includes a detector enable signal maintaining a constant state for at least 100 nsec.

6. The transponder subsystem of claim 1, wherein said transponder signal also contains a second pulse that is asynchronous with respect to said synchronization signal.

7. The transponder subsystem of claim 1, said phase detector further comprising a delay line connected to an output of said qualifier, and a comparator comparing states of said transponder signal during previous and current clock cycles.

8. The transponder subsystem of claim 1, further comprising a detector determining whether said detector enable signal determined by said qualifier constitutes a valid signal.

9. The transponder subsystem of claim 1, further comprising a detector determining whether said detector enable signal determined by said qualifier falls within an acceptance window following a leading edge of said first pulse.

10. The transponder subsystem of claim 1, further comprising a delay counter counting down a predetermined time delay following a leading edge of said first signal before enabling said qualifier.

11. The transponder subsystem of claim 1, further comprising a window timer for counting down a length of an acceptance time window during which said transponder signal must occur to be a valid transponder signal.

12. A Mode-S transponder, comprising:
a receiver for receiving air traffic communications signals from an Air Traffic Control Radar Beacon System (ATCRBS);
a demodulator for demodulating said air traffic communications signals and outputting a data segment formatted in accordance with a predefined mode of communications; and a detection module for validating a synchronization pulse embedded within said data segment based in part upon a length of said synchronization pulse.

13. The transponder of claim 12, wherein said processor determines whether an amplitude of said air traffic communication signals is greater than a threshold.

14. The transponder of claim 12, wherein said predefined mode of communications constitutes Mode-S and said synchronization pulse constitutes an SPR signal in a P6 data pulse of a Mode-S signal.

15. The transponder of claim 12, wherein said detection module includes an SPR qualifier determining whether a state change in said synchronization pulse is maintained for at least a predetermined minimum length of time sufficient to qualify said synchronization pulse as a detector enable signal.

16. A subsystem for controlling reply of a transponder to Mode-S interrogation signals, comprising:
an input for receiving Mode-S signals containing a reference pulse and a P6 pulse, each of said P6 pulses containing a sink phase reversal (SPR) signal followed by a data segment containing Mode-S data, said reference and P6 pulses being separated in time by a pulse separation time and differing in amplitude from one another by a pulse amplitude difference;
means for comparing at least one of said pulse amplitude difference and said pulse separation time with an amplitude difference threshold and a separation time threshold, respectively;
means for setting at least one of said amplitude difference threshold and said separation time threshold such that said SPR signal is correctly identified in at least 95% of said received Mode-S signals in which said amplitude of said P6 pulse is at least 12 dB greater than said amplitude of said reference pulse; and
an output for producing a reply to Mode-S signals for which said SPR signal is correctly identified.

17. The subsystem of claim 16, wherein said means for setting sets said at least one of said amplitude difference threshold and said separation time threshold such that said SPR signal Is identified correctly in at least 97% of said received Mode-S signals in which said amplitude of said P6 pulse is at least 6 dB greater than said amplitude of said reference pulse.

18. The subsystem of claim 16, wherein said means for setting sets said at least one of said amplitude difference threshold and said separation time threshold such that said SPR signal is correctly identified in at least 55% of said received Mode-S signals in which said amplitude of said P6 pulse is at least 3 dB greater than said amplitude of said reference pulse.

19. The subsystem of claim 16, further comprising means for determining whether said P6 pulse changes state within an SPR acceptance window of time following a leading edge of said P6 pulse, thereby qualifying as a potential SPR signal.

20. The subsystem of claim 16, further comprising means for determining whether said P6 pulse changes state from a first state to a second state and remains at said second state for at least a minimum time period, sufficient to qualify as a potential SPR signal.

* * * * *